1,519,266

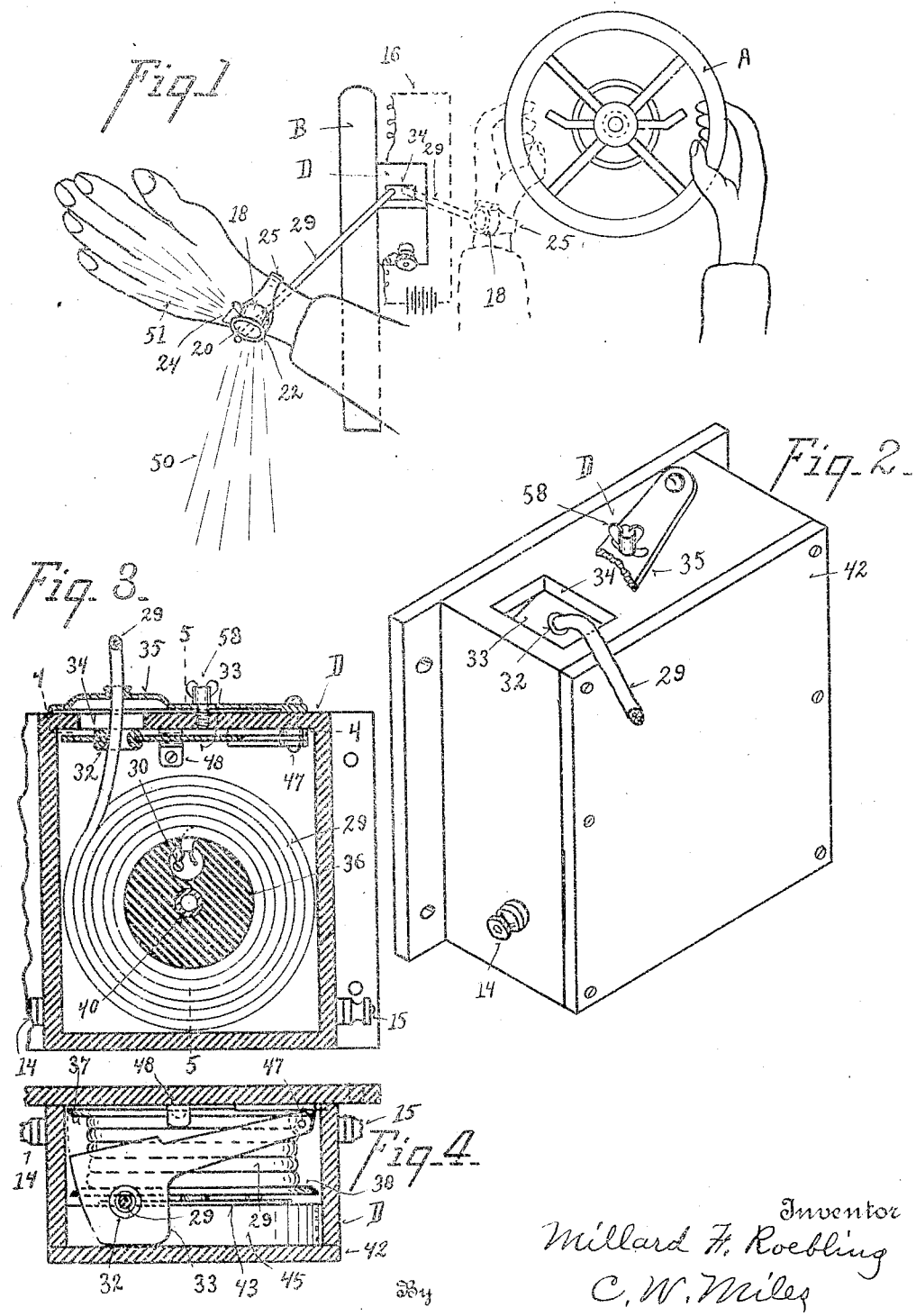

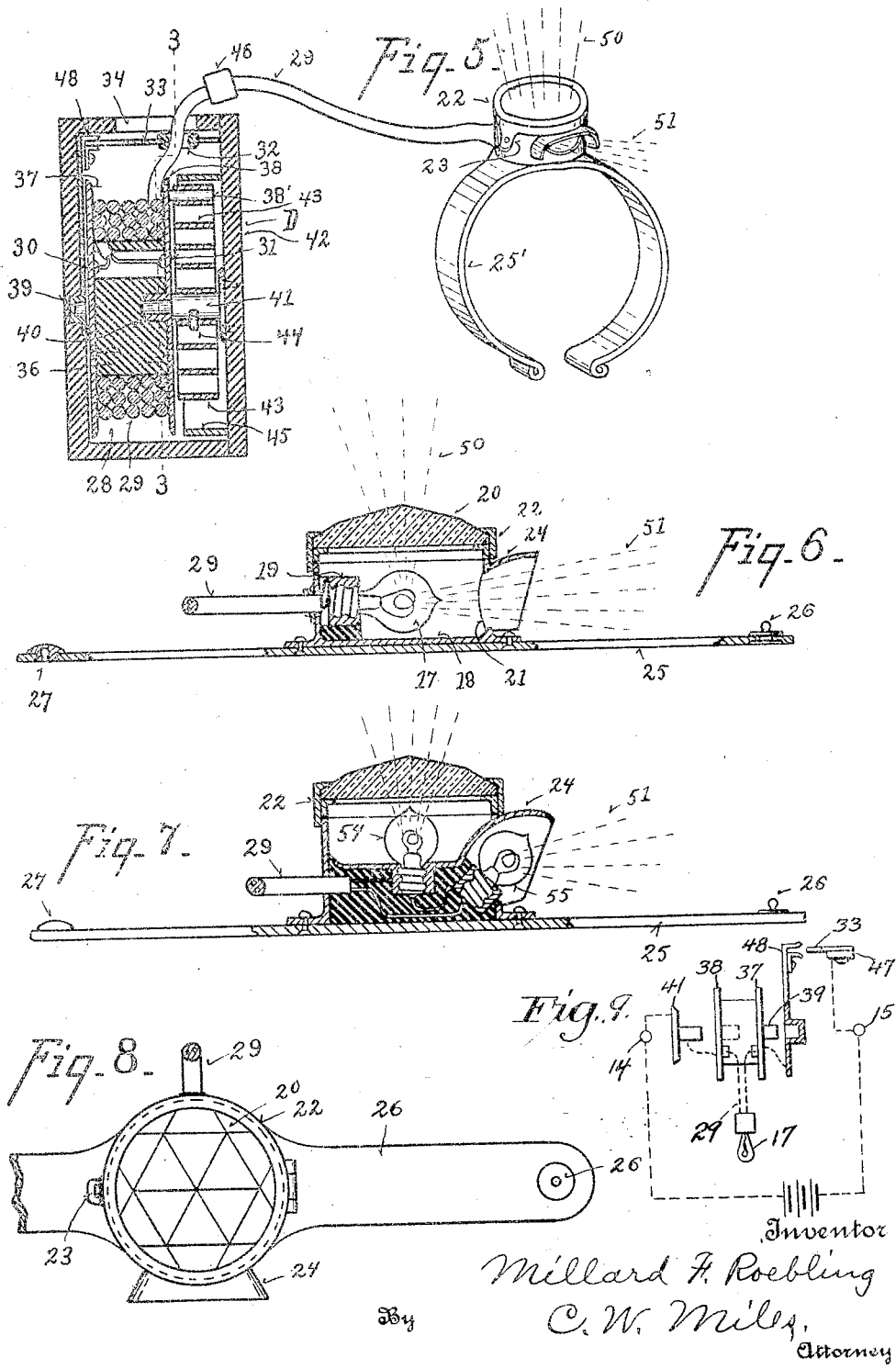
Dec. 16, 1924.                                      1,519,266
M. F. ROEBLING
SIGNAL LAMP
Filed Sept. 2, 1919        2 Sheets-Sheet 2
Inventor
Millard F. Roebling
By C. W. Miles,
Attorney Patented Dec. 16, 1924.

UNITED STATES PATENT OFFICE.

MILLARD F. ROEBLING, OF CINCINNATI, OHIO.

SIGNAL LAMP.

Application filed September 2, 1919. Serial No. 321,215.

*To all whom it may concern:*

Be it known that I, MILLARD F. ROEBLING, a citizen of the United States, residing at Cincinnati, in the county of Hamilton and State of Ohio, have invented certain new and useful Improvements in Signal Lamps, of which the following is a specification.

My invention relates to improvements in portable electric light and signal apparatus. One of its objects is to provide an improved signal apparatus for use on automobiles and for similar purposes. Another object is to provide an improved signal light which may also be conveniently used as a portable or trouble light. Another object is to provide an improved signal light and automatic off and on switch mechanism therefor. Another object is to provide an improved signal light r spot-light and improved take-up means for the lamp cord. Another object is to provide an improved signal light giving out a plurality of light pencils for signal purposes. Another object is to provide an improved signal light readily detachable when required. My invention also comprises certain details of form, combination and arrangement, all of which will be fully set forth in the description of the accompanying drawings, in which:

Fig. 1 is a diagram illustrating my improved signal and portable light apparatus applied to an automobile.

Fig. 2 is a perspective view of the automatic switch and lamp cord take-up casing detached.

Fig. 3 is a diagram of the switch and take-up apparatus within said casing, with the front of the casing detached.

Fig. 4 is a sectional detail through the switch and take-up casing on line 4—4 of Fig. 3.

Fig. 5 is a section taken on line 5—5 of Fig. 3.

Fig. 6 is sectional detail through the signal light, and illustrating a modification of Fig. 5.

Fig. 7 is a view similar to Fig. 6 also illustrating a modification.

Fig. 8 is a plan view of the signal light illustrated in Fig. 1.

Fig. 9 is a wiring diagram.

The accompanying drawings illustrate the preferred embodiments of my invention, in which, Figs. 1 to 4, A represents the steering wheel of an automobile, and B represents the side door of the automobile adjacent to the steering wheel. A casing D is preferably detachably connected to the door B, and is provided with binding posts 14 and 15 by means of which it may be connected into an electric circuit 16, of a storage battery or set of dry cells for instance, suitable for energizing the signal light 17. The light 17 is preferably of the incandescent type, and mounted detachably in a housing 18 having a lamp socket 19, a colored lens or plate 20 through which a colored light pencil issues when the light 17 is in circuit, and a port 21 through which a white pencil of light may also issue when the light 17 is in circuit. The lens 20 is preferably mounted in a cap 22 which is hinged to the casing or housing 18 at one side and provided with a spring latch 23 at the opposite side, whereby the cap may be opened to give access to the interior of the housing 18, as for instance to insert or remove the light 17. The port 21 may be glazed if desired, and is preferably provided with a hood 24 to prevent diffusion of the light rays issuing therethrough. The housing 18 is preferably encased in leather or similar protecting material, and attached to the wrist or back of the hand of the operator of the steering wheel, preferably substantially in the same manner as a wrist watch is attached, except that it is attached so as to be readily and quickly detached should it become necessary. As illustrated in Figs. 1, 6, 7, and 8, the casing or housing 18 is carried by a leather band 25 provided at one end with a small projection or knob 26, and at the other end with a corresponding socket 27 to detachably engage said knob, thereby providing for quickly detaching the band 25 from the wrist. As illustrated in Fig. 5, a resilient metal band $25^1$ is employed to hold the housing 18 in place upon the wrist, and to enable it to be quickly detached if necessary.

Mounted within the casing D is a drum 28 on which is wound a considerable length of lamp cord 29, the respective terminals of said cord at the inner end being attached electrically to the terminals 30 and 31 of said drum 28. The opposite end of the lamp cord passes out of the casing D through an eye 32 in an electrical switch lever 33, and through the opening 34 in the casing D, which is preferably protected from the weather by means of a hood 35 externally of the casing D, and preferably pivotally attached thereto. The drum 28 is preferably constructed of a hub 36 of insulating material to which the side plates 37 and 38 are separately attached by screws, and said insulated hub provides for electrically separating or insulating the terminals 30 and 31. A stud projecting from the plate 37 journals in a socket 39 in one face of the casing D, while the other plate 38 is provided with a sleeve 40 seated in a recess in the hub 36, which forms a journal for the end of a stud shaft 41 rigidly attached to the removable plate 42 of the casing D. A coiled spring 43 is mounted upon and attached at one end by a screw or projection 44 to the stud shaft 41. The opposite end of said spring 43 has a loop or eye therein which is engaged by a stud or pin 38′ projecting from the side-plate 38, so that when the lamp cord is unwound from the drum, the coiled spring 43 is placed under tension, and when strain on the cord is relieved, the spring 43 rotates the drum 28 to rewind the cord thereon. A spring barrel 45 is preferably employed attached to the plate 42 of casing D to limit the unwinding of the spring 43. A stop 46 attached to the cord limits the amount thereof which may be wound upon the drum, due to said stop not being able to pass the eye in the hood 35 or the eye 32 of the switch lever.

The switch lever 33 is pivotally attached at 47 to the casing D, and is movable into and out of engagement with the blades of a switch member 48 to open and close the circuit 16. From the binding post 14 the circuit inside the casing D is to the stud shaft 41 thence through plate 38 to terminal 31 through the lamp cord to the light 17, and thence returning through the lamp cord to circuit terminal 30, thence by the plate 37 and socket 39 to switch member 48, and thence when the switch is closed by the switch lever 33 to its support 47, and thence to the binding post 15, see Figs. 4, 5, and 9. The casing D is preferably constructed from some insulating material, as for instance vulcanized fiber, or hard wood.

In operation, the position of the hand as indicated in dotted line Fig. 1. upon the steering wheel shifts the switch lever 33, due to the tension of the lamp cord thereon, to a position out of engagement with the terminal 48, thereby holding the circuit 16 open. When it is desired to signal the direction to be taken at a street intersection the hand is thrown out as indicated in full line, thereby causing the tension of the lamp cord upon the switch lever 33 to be reversed to thereby automatically bring the switch lever 33 into engagement with the switch member 48 to close the circuit 16 and illuminate the lamp 17, causing a pencil 50 of say red light to be directed rearwardly to warn any automobile in the rear of a stop or turn about to be made. Also through the port 21 of the housing 18 is directed a pencil 51 of white light upon the back of the hand, which serves to illuminate the hand and enable the party in the rear or following machine to observe the signal made by the hand. Also where a portable light or trouble light is required, a sufficient length of lamp cord is available to enable the operator to carry the housing 18, on his wrist or otherwise to practically any part of the automobile, and the direct white light through the port 21 upon the parts to be examined, or if desired the cap 22 may be thrown open and a pencil of white light in place of the pencil of colored light directed upon the object to be examined. Either type of signal light may be readily and quickly detached from the wrist if required. In the modification Fig. 7 I have illustrated two electric bulbs 54 and 55 one to supply a pencil of colored light, and the other to furnish a pencil of white light, said bulbs being mounted in separate sockets and connected in the circuit in series, or if desired in parallel.

A thumb-screw 58 threaded to the casing D and passing through a slot 59 in the hood 35 provides for clamping said hood to the casing so as to hold the lamp cord 29, and with it the switch lever 33 at either extremity of their movement relative to the opening 34 in the casing D, and thereby provides for the current being positively cut out of the lamp circuit, or positively fed through the lamp, as for instance when used as a trouble lamp or spot-light.

The lamp 17 of Fig. 6, or either of the lamps of Fig. 7 may be conveniently used as a spot-light in passing obstructions, and on narrow roads, and for such purpose the cap 20 may be opened and the lamp used on either side of the car, and turned in any direction, front, rear, or sides, while still attached to the hand, or if desired may be readily detached while being used for such purpose. It may further be employed conveniently under any circumstances where the head or side lights fail to furnish the illumination desired, as for instance as an emergency light to reach a repair station where the head and side lights fail from any cause. It may also be employed as a dash-light.

The apparatus herein illustrated and described is capable of considerable modification without departing from the principle of my invention.

What I claim is:

1. A signal apparatus comprising a portable signal lamp, a lamp cord, a winding drum under tension on which said lamp cord is wound, an electric circuit in which said lamp and cord are included, and a switch lever to open and close said circuit, said switch lever being engaged by said lamp cord and automatically actuated by movement of said lamp cord due to shifting the position of said lamp from one side to the other relative to said switch lever.

2. A signal apparatus comprising a signal lamp, means to detachably connect said lamp to the wrist of an operator, a winding drum under tension, a lamp cord connecting said lamp to said drum, an electric circuit in which said lamp and cord are included, and an electric switch lever in said circuit engaged by the lamp cord under tension connecting the operator's wrist with said winding drum to automatically actuate said switch lever upon changing the position of said lamp from one side to the other of said switch.

3. A signal apparatus comprising a portable signal lamp, a lamp cord, a winding drum under tension on which said lamp cord is wound, an electric circuit in which said lamp and cord are included, and a switch lever to open and close said circuit having an eye through which said lamp cord is threaded and which switch lever is actuated through said lamp cord by changes in the position of said lamp from one side to the other of said switch.

4. A vehicle signal apparatus comprising a portable lamp, a lamp cord, a lamp casing, means for detachably attaching the lamp casing to the wrist of an operator, an electric circuit for said lamp including said lamp and lamp cord, and a source of current carried by said vehicle, and a switch in said circuit carried rigidly by said vehicle and actuated by movement of said lamp cord in changing the position of said lamp from one side to the other of said switch.

5. A signal apparatus comprising a portable signal lamp, a lamp cord, a winding drum having terminals insulated from each other and supported under tension to the terminals of which said lamp cord is connected at one end, an electric circuit in which said lamp, lamp cord, and drum are included, and a yieldingly energized switch mechanism tending normally to open said circuit, said switch mechanism being engaged by said lamp cord under tension from said drum to automatically close said circuit when the lamp is shifted to one side of said switch mechanism.

6. A vehicle signal apparatus comprising a portable lamp, a lamp cord, a lamp casing, an electric circuit for said lamp including said lamp and cord and a source of current carried by said vehicle, a switch in said circuit carried rigidly by said vehicle and actuated by movement of said lamp cord in changes in the position of said lamp to one side, or the other of said switch, and means to positively lock said switch in one position.

In testimony whereof I have affixed my signature.

MILLARD F. ROEBLING